Feb. 9, 1960   W. A. CARRIVEAU   2,924,109
HAND TOOL FOR REMOVING V-BELTS
Filed May 21, 1958

INVENTOR.
WILFRED A. CARRIVEAU
BY Lyon & Lyon
ATTORNEYS

2,924,109
HAND TOOL FOR REMOVING V-BELTS

Wilfred A. Carriveau, Hawthorne, Calif.

Application May 21, 1958, Serial No. 736,781

3 Claims. (Cl. 74—242.7)

This invention relates to hand tools which are primarily made for use by shop mechanics and has particular reference to a certain new and improved special tool which serves to lift, displace and remove a V-belt from a flanged pulley wheel.

Typical machine shops have a number of pulley driven power tools utilizing the V-belt. In such tools it is necessary to maintain the belt under tension to prevent slipping of the belt with respect to the pulley wheels. Accordingly, to remove the belt from a pulley, it is necessary to stretch it and lift it out of the groove in which it rides.

Conventionally, this is accomplished by inserting a hand tool, such as a screw driver across the flanges of the pulley wheel, stretching the belt and then forcing it out of the plane of the groove.

Removing the belt by this method is generally unsatisfactory, particularly over an extended period of time and is unsafe. Since the hand tool conventionally used crosses the flanges, they tend to become scarred and dented. In addition, if tools having general utilitarian use are employed, they may become damaged, increasing unnecessarily shop tool cost.

Accordingly, it is an object of this invention to provide a special tool for use in removing V-belts which is not subject to the above disadvantages.

A further object of this invention is to provide such a tool which is of simple and economical construction.

A more particular object of this invention is to provide such tool which may be used safely and repeatedly in removing V-belts from pulley wheels of varying sizes.

These objects are accomplished by providing a hand tool of unitary structure which may be inserted into the groove of a flanged pulley wheel, said structure including a radially deflecting cam portion and a laterally deflecting wedge portion.

Figure 1:
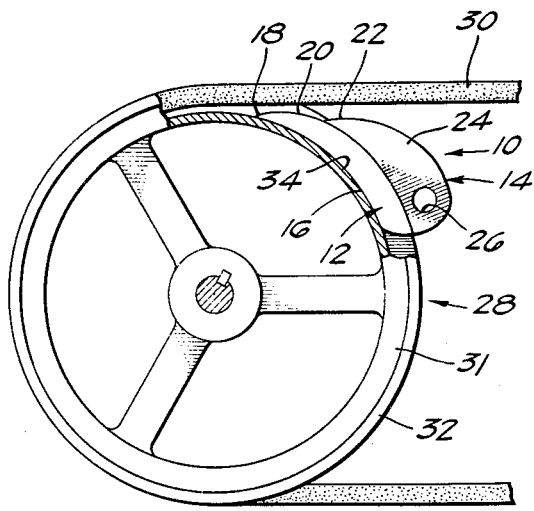
Figure 4:
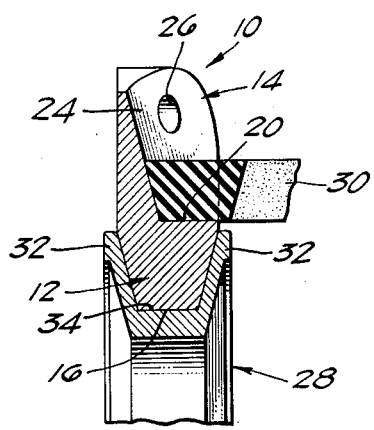
Figure 2:
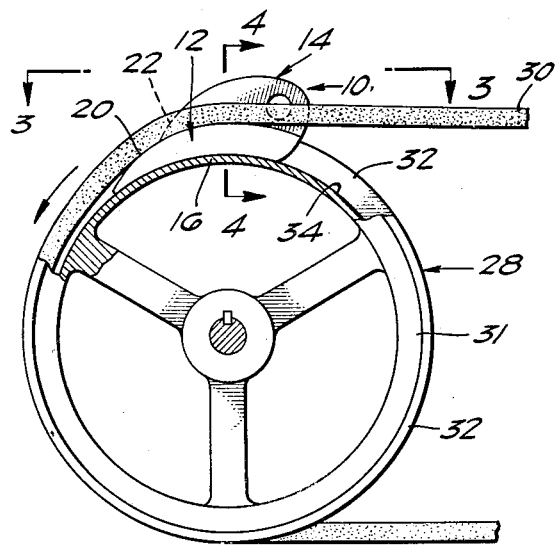
Figure 5:
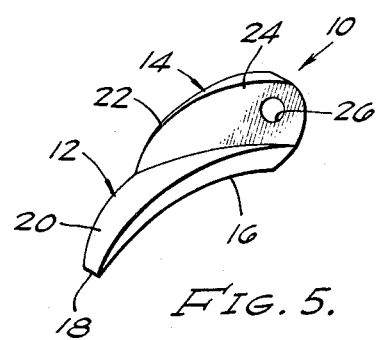
Figure 3:
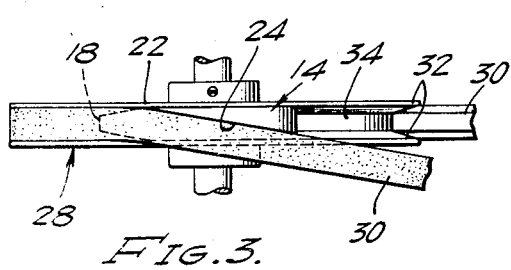

Other objects and advantages of this invention, it is believed, will be readily apparent from the following detailed description of a preferred embodiment thereof when taken in connection with the accompanying drawings in which:

Fig. 1 is a side elevation of a pulley wheel partially broken away, showing the hand tool in the pulley groove, Fig. 2 is a side elevation of a pulley wheel showing the tool in contact with the V-belt, Fig. 3 is a top view taken substantially along the line 3—3 of Fig. 2, Fig. 4 is a sectionalized view, partially broken away, taken substantially along the line 4—4 of Fig. 2 and Fig. 5 is a perspective view of the hand tool.

Referring now to the drawings, the hand tool for use in removing the V-belt from a flanged pulley wheel is indicated generally at 10. The tool is of unitary structure and may be preferably formed from metals such as aluminum or stainless steel.

The tool has a cam portion 12 and a wedge portion 14. The cam portion 12 is provided with an arcuate inner surface 16, a leading edge 18, and a radially camming surface 20. The camming surface 20, which joins the inner surface 16 at the leading edge 18, diverges from the inner surface from the leading edge rearwardly toward the wedge portion 14.

As will be more particularly illustrated below, the radius of the arcuate inner surface 16 will be determined generally by the radius of the pulley wheel to which it is to be applied, while the amount of divergence between the inner surface and the camming surface and thus the cross-sectional area of the cam portion will be determined by the height of the flange on the particular pulley wheel to which the tool is applied.

As shown in Fig. 4 the cam portion is in cross-section substantially similar to the cross-sectional formation of the pulley groove and is preferably generally trapezoidal.

Formed integrally with the cam portion and protruding above the surface thereof is the wedge portion 14. The wedge portion is provided with a forward edge 22 which is circumferentially displaced rearwardly with respect to the leading edge 18 of the cam portion. Extending rearwardly from the forward edge 22 and angularly with respect to the radially camming surface 20 is a laterally deflecting surface 24. The wedge portion, in addition to deflecting the V-belt, may be used as a handle for inserting and withdrawing the tool from the pulley wheel. For convenience, the rearward section of the wedge portion is provided with a transverse opening 26 by which the hand tool may be conveniently suspended when not in use.

A typical pulley wheel 28 carrying a V-belt 30 is indicated generally in Fig. 1. Typically, the wheel rim 31 is formed with a pair of outwardly diverging flanges 32 which extend from the circumferential surface 34 of the wheel. By this construction, as shown in Fig. 4, the rim 31 of the wheel is generally trapezoidal in cross-section.

The V-belt 30 rides on the inner edges of the flanges and does not contact the circumferential surface 34. While ideally the arcuate inner surface 16 of the tool has a radius equal to that of the surface 34, in practice, a given tool may be used on pulleys having radii greater or lesser than the radius of a given arcuate inner surface.

In order for the tool to throw the belt off the wheel the radially camming surface 20 must raise the belt above the peripheral edges of the flanges so that the laterally deflecting surface 24 may force the V-belt out of the plane of the wheel. Accordingly, the amount of divergence between the surfaces 16 and 20 will be dictated by the size of the rim to which the tool is to be applied.

In the use of the device thus described, the hand tool is placed between the flanges 32 on the open side of the wheel 28, the leading edge 18 pointed in the direction of travel of the wheel and held against the wheel until the radially camming surface 20 contacts the under surface of the V-belt 30. Friction now forces the tool to follow the wheel permitting the operator to remove his hand from the vicinity of the pulley. As rotation continues, the radially camming surface 20 forces the belt outwardly from the center of the wheel until it is raised above the peripheral edges of the flanges 32. At this point the edge of the belt contacts the laterally deflecting surface 24 whereby the belt is forced to one side of the wheel.

After approximately a 180° rotation the belt slips off the wheel, permitting its ready replacement or repair.

Having fully described my invention, it is to be understood that I do not wish to be limited to the details set forth, but my invention is of the full scope of the appended claims.

I claim:
1. A tool for use in removing a V-belt from a flanged pulley comprising: a cam portion having an arcuate inner surface, a leading edge and a radially camming surface diverging from said inner surface rearwardly of said leading edge; and a deflecting wedge portion protruding above said radially camming surface, said wedge portion having a laterally deflecting surface and a forward edge, said forward edge being circumferentially displaced rearwardly with respect to the leading edge of said cam portion.

2. In a tool for use in removing a V-belt from a pulley wheel, the pulley wheel having a pair of outwardly diverging flanges as a part of the rim thereof, the tool comprising, in combination: a cam portion having an arcuate inner surface, a leading edge and a radially camming surface diverging from said inner surface rearwardly of said leading edge, the maximum divergence of said radially camming surface from said arcuate inner surface being at least equal to the height of said flanges; and a deflecting wedge portion protruding above said radially camming surface, said wedge portion having a laterally deflecting surface and a forward edge, said forward edge being circumferentially displaced rearwardly with respect to the leading edge of said cam portion.

3. A tool for use in removing a V-belt from a flanged pulley comprising: a cam portion having an arcuate inner surface, a leading edge and a radially camming surface diverging from said inner surface rearwardly of said leading edge, said leading edge being common to both said arcuate inner surface and said radially camming surface, said cam portion being generally trapezoidal in cross section throughout the majority of its effective length; and a deflecting wedge portion protruding above said radially camming surface, said wedge portion having a laterally deflecting surface and a forward edge, said forward edge being circumferentially displaced rearwardly with respect to the leading edge of said cam portion.

References Cited in the file of this patent
UNITED STATES PATENTS

| | | |
|---|---|---|
| 2,620,996 | Le Bus | Dec. 9, 1952 |
| 2,708,080 | Le Bus, Sr. | May 10, 1955 |